INVENTORS
ELIE CONDOLIOS
PIERRE BELUGOU

BY George H. Corey

ATTORNEY

INVENTOR
ELIE CONDOLIOS
PIERRE BELUGOU

BY George H Corey

ATTORNEY

United States Patent Office 2,946,439
Patented July 26, 1960

2,946,439

PROCESS AND APPARATUS FOR THE SEPARATION OF SOLID PARTICULATE MATERIALS OF DIFFERENT DENSITIES AND/OR DIFFERENT PARTICLE SIZE

Elie Condolios, Grenoble, and Pierre Belugou, Paris, France, assignors to Etablissements Neyrpic, Grenoble, and Charbonnages de France, Paris, France, a public institution of France Filed Nov. 23, 1956, Ser. No. 627,533

Claims priority, application France Nov. 25, 1955

23 Claims. (Cl. 209—157)

The present invention has for an object a process and apparatus for sorting or classifying of solid materials according to the differences in the relative densities of the particles thereof or the differences in the sizes of the particles or a combination of these two characteristics of the material which is subjected to the sorting treatment. More particularly, the invention concerns the use of an apparatus and the apparatus per se characterized by an inclined closed conduit through which a fluid, either liquid or gaseous, is passed under a hydraulic head from a lower inlet to a higher outlet while the crude material that is to undergo the sorting is introduced into the flow of the fluid intermediate the ends of the conduit, the velocity of the fluid flow being regulated between the respective velocity limits of deposit of the constituents of each cut or fraction that it is intended to produce, while the inclination of the conduit is so adjusted that its action on the materials in the direction opposed to the flow of the fluid brings about the formation of a more or less substantial stationary dune that is constantly stirred or agitated by the fluid, thus permitting lighter or smaller suspendable particles to be carried along downstream in the liquid flow and permitting heavier or larger particles to move downwardly in the conduit away from the stationary dune in the upstream direction with regard to the fluid flow where they are separately collected.

The velocity limit of deposit of any solid particulate material to which one refers herein, for a predetermined velocity of fluid flow and conduit diameter, may be taken as that velocity above which the particular material becomes positively entrained by the flow, either because of saltation, that is to say through making successive leaps or bounds, or by suspension, that is to say, by becoming a part of the fluid flow.

As will be brought out in further detail hereinafter the apparatus may take various forms and includes various arrangements whereby the material passing through the sorting conduit may be subjected to the action of two or more dunes either through recycling of a part of the partly sorted material and re-introducing it at a suitable point in the conduit or by suitable regulation of the velocity of flow of the fluid at localized points in the conduit or adjustment of the head or the inclination of the conduit or various combinations of these features. In this way the separating operation will be carried out with greater accuracy and efficiency than would be possible through utilization of only one dune. Inasmuch as the necessary head required to sustain the hydraulic operation of the apparatus is low, the energy required to maintain such head is comparatively small.

Other advantages and novel features of the invention will become apparent from the following description of representative embodiments of apparatus useful in practicing the invention and set forth in the accompanying drawings, in which.

In the example represented schematically in Fig. 1 to which reference will be made first of all, an apparatus according to the invention is provided for separating crude products into light and heavy constituents according to a predetermined degree of separation or cut.

This apparatus includes an inclined closed conduit 10. Conduit 10 is completely filled and traversed by a liquid circulating therethrough under a suitable head from the lower end 11 to the upper end 12. A crude material to be sorted is introduced into an intermediate zone of the conduit by way of the inlet pipe 13. The connection of the inlet pipe 13 to the sorting conduit 10 can be effected at a point on the upper side of the wall of the conduit, for example, according to the plane of symmetry thereof as shown in the drawing, or it may be disposed laterally thereof. The point of discharge of the light constituent coincides with the upper end 12 of the conduit 10 and an outlet 14 for the heavy constituent is connected to the conduit 10 in a lower zone situated on the upstream side of the inlet 13. Between the inlet 13 for the crude material and the outlet 14 for the heavy material there is provided a slight local restriction 13' of the section of the conduit 10.

In operation, a liquid flow is established through the conduit 10 from the lower extremity 11 to the upper extremity 12 at a velocity which is suitably chosen between the respective velocity limits of deposit of the material which is presumed to be denser and the material which is presumed to be lighter amongst the mixture to be sorted so as to establish a point of separation of the mixture into predetermined fractions according to density or particle size as desired.

The mixture of crude materials which is introduced into the established liquid flow collects not far from its point of introduction 13 on the bottom of the closed conduit 10 in the form of a dune D. The restriction 13' contributes to the stabilization of this dune. The mixture of materials in the dune D is subjected to two opposing actions. One is the ascending or entraining action of the liquid current which, by reason of the increase in its velocity, acts on the top of the dune, and the other a descending action due to the inclination of the conduit 10 which acts particularly on the base of the dune. Consequently, the dune D is continuously rubbed or turned upon itself as hereinbefore described.

The inclination of the closed conduit 10 can be constant or variable between the extremities 11 and 12. It is in any case chosen such that it favors the internal stirring or rubbing of the particles in the dune D while not opposing a stationary and persisting condition of the dune.

This being the case, the lighter particles escape from the dune D in the downstream direction passing upwardly along the conduit 10 out of the outlet 12 where they are collected, while the heavy particles likewise escape from the dune D but toward the upstream, descending along the conduit 10 to the discharge outlet 14 where they are collected.

The apparatus functions thus in a continuous manner, that is to say, with a continuous feeding in of crude material at 13 and with a continuous extraction of the light material at 12 and of the heavy material at 14. Despite this advantage, one observes a small proportion of strayed or entrapped material, that is to say, particles denser than the density of the collected fraction or cut which collect with the lighter particles on the one hand and some less dense particles collecting with the heavier cut.

Figure 2:
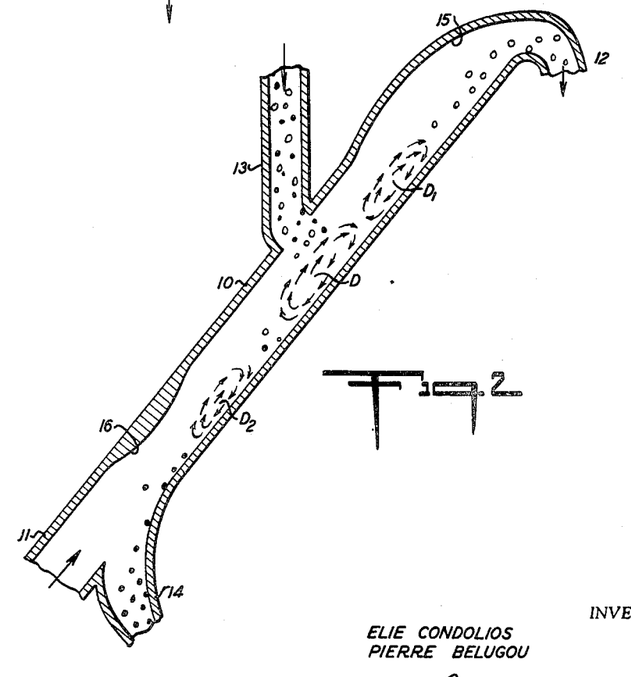
Fig. 2 is a schematic view in longitudinal section of a sorting conduit which is constructed in accordance with the invention to provide a plurality of space dunes for separating out the heavier constituent of the material.

Reference is now made to Fig. 2 where means is provided for diminishing still further the proportion of such strayed or lost material. This advantageously includes means for promoting the form of auxiliary dunes for rewashing or recycling as a supplement to the principal dune D. According to Fig. 2, 10 is the inclined closed conduit, 11 the inlet for the liquid, 13 the inlet for the crude material, 12 the discharge outlet for the liquid and the light material, and 14 the discharge outlet for the heavy fraction. In order to further the formation of two auxiliary dunes for rewashing, the conduit 10 comprises an enlargement of the section 15 disposed at the downstream side of the feed connection 13 and a restriction of the section 16 disposed at the upstream side of the connection 13. As in the preceding, the crude material introduced at 13 forms the dune D from which the light material escapes upwardly and the heavy material passes downwardly.

In passing upwardly toward the downstream end of the sorting conduit, the light and the stray heavy or intermediate particles which accompany the light particles are submitted to a local decrease of the velocity of flow due to the enlargement of the section of the conduit at 15. They form there a dune for rewashing $D_1$ where everything occurs as in dune D except that the density of cut is lower and only the truly light material is permitted to escape from the dune $D_1$ toward the outlet 12 while the stray, heavy and intermediate materials are returned from the dune $D_1$ toward the principal dune D.

stream direction, the heavier and the stray light or intermediate density particles which accompany them are subjected to a local increase of velocity of flow due to the restriction of the section at 16. They form, therefore, a rewashing dune $D_2$ where the same action occurs as in Dune D but under conditions which insure a sharper separation so that only the truly heavy particles are permitted to escape upstream from the dune $D_2$ and pass off through the discharge 14, while the stray, lighter or intermediate particles are carried forward from the dune $D_2$ toward the principal dune D.

Figure 3:
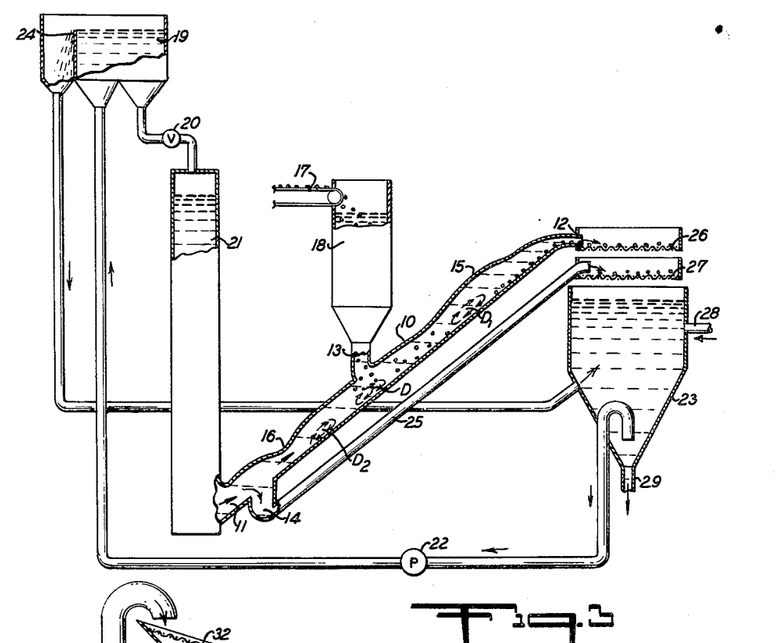
Fig. 3 is a schematic view in longitudinal section of a system for treating a solid particulate material composed of two products of different densities, e.g. coal contaminated by schist, by the utilization of two dunes in accordance with the invention.

Reference will now be made to Fig. 3 which concerns by way of example an industrial application for the treatment of uncleaned coal with the sorting conduit described in Fig. 2. It will be noted from Fig. 3 that the sorting conduit 10 is provided with varying sections 15 and 16, with the water being admitted at 11 and the crude material admitted at 13, the discharge of the washed coal and water taking place at 12 and the discharge of the schist taking place at 14.

The crude material is brought by an endless conveyor 17 into a receiving chamber 18 connected at 13 to the conduit 10. The water is provided from a feed tank or feeding basin 19 and is conveyed at a constant discharge through a regulating valve 20 into a column or supply tank 21 connected at 11 to the conduit 10. The water level in the column 21 is maintained such as to insure the desired hydraulic head and velocity of flow through the conduit 10.

Tank or basin 19 receives its water from a pump 22 connected to a collection basin 23 and the water level therein is substantially constant thanks to an overflow weir 24. The excess water passing over the weir is returned to the basin 23 by a suitable conduit.

The water admitted at 11 is in the main directed into the conduit 10 and passes upwardly to the outlet 12 entraining therewith the washed coal. A part of the water also passes into the outlet 14 for discharge of the schist whence it flows upwardly through the pipe 25 and promotes the passage of the schist therethrough.

In the particulate uncleaned coal fed to the water from the chamber 18 the heavier constituent is the schist and it will collect on the bottom of the conduit 10. Many of the coal particles also will be carried down with the settling particles of schist, while the remainder of the coal particles will be entrained in the flow of the water. As has been previously explained, the inclination of the conduit and the velocity of flow of the water therein is such that their combined action on the deposited coal and schist particles brings about the formation of a substantially stationary dune which is being constantly stirred. During this stirring movement of the dune, the lighter particles thereof which are composed almost entirely of the coal particles, will continuously escape from the dune to be carried away by the flow of water, while the heavier particles which are composed almost entirely of the schist particles, will gravitate downwardly along the substantially smooth bottom of the conduit away from the dune. The particles that escape from the dune and are carried away by the water, are likely to include particles of schist. Accordingly, in order that such stray particles of schist may be removed from the coal before they reach the place of discharge 12, the conduit is provided with the enlarged section 15 to form a rewashing dune $D_1$ of such stray particles of schist and the less dense particles of coal. Dune $D_1$, like dune D, a substantially stationary, constantly stirred dune and in a like fashion the less dense coal particles are caused to escape therefrom into the flow of water and the heavier particles of schist are caused to descend downwardly in the conduit away from the dune $D_1$ and toward the original dune D. As has been previously indicated, the particles of schist that travelled downwardly in the conduit from the dune D are likely to include stray particles of coal and in order to remove the latter the conduit 10 is provided with a restriction at 16 to cause the formation of a second rewashing due $D_2$. As in the case of the previously discussed dunes D and $D_1$, dune $D_2$ is a substantially stationary, constantly stirred dune where the same action occurs as in dunes D and $D_1$ but under conditions that cause only the heavy particles composed almost entirely of schist particles to descend downwardly from the dune $D_2$ toward the place of discharge 14, while the lighter particles including practically all of the stray coal particles are carried by the flow of water from the dune $D_2$ toward the original dune D.

The washed coal and the schist are discharged to devices intended to dewater and deslime them, such as the vibrating screens 26 and 27, as shown, or to other suitable means for dewatering and desliming these products.

When the crude material is slimy, a feed of clear water may be introduced, as at 28, and water charged with slimes may be withdrawn from the bottom of the basin 23, as at 29, in order to minimize the concentration of the slimes in the washing circuit.

Figure 4:
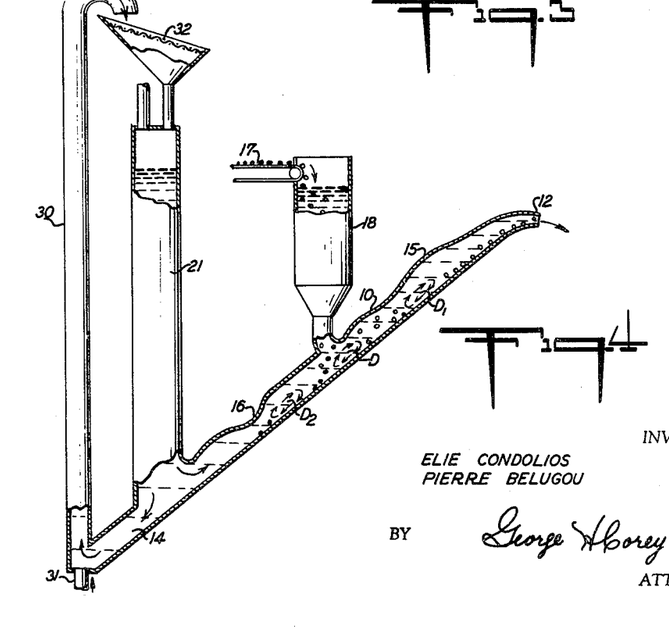
Fig. 4 is a schematic view in longitudinal section of an apparatus similar to one part of the structure shown in Fig. 3 but concerned more particularly with a modification whereby means are provided for avoiding all disturbances due to variations of the fluid discharge.

Reference will now be made to Fig. 4 where the arrangement is somewhat analogous to that which has just been described in reference to Fig. 3. It will be observed that in Fig. 4 the sorting takes place in conduit 10, the feeder 17 supplies the crude materials to the receiving chamber 18, the feeding column 21 supplies the conduit 10 and the lighter material is discharged at 12 with the heavier material being withdrawn at 14.

In the arrangement of Fig. 4 means are provided for avoiding all disturbances due to any variation in the amount of water withdrawn at 14 along with the heavier material. This is accomplished by reintroducing systematically into the apparatus an amount of water corresponding to that discharged therefrom. In the example shown, the passage 14 through which the heavier material is withdrawn is connected to a vertical tube 30. This tube is of the airlift type wherein air is injected at its base as at 31 and insures the lifting of the heavy material and the water associated therewith.

The mixture of air, water and the heavier material is discharged from the tube 30 on to an inclined grille or screen 32 supported above the liquid column 21. In this manner the heavier materials are collected on the grille 32 while the water associated therewith is restored to the column 21.

In another modification (Fig. 5), the disposition is closely similar to that which has just been described in reference to Fig. 4. It will be observed that 10 is the sorting conduit, 21 the feeding column for the water for this conduit, 30 the airlift tube which assures the elevating of the heavier material to the grille 32 and which restores the water to the column 21, and at 18 the receiving chamber for the crude material feeding into the conduit 10, but here the feeder 17 is of the hydraulic type and feeds water as well as the crude materials to the receiving chamber. This arrangement is advantageous especially when the crude material to be treated finds itself already mixed with water.

Figure 5:
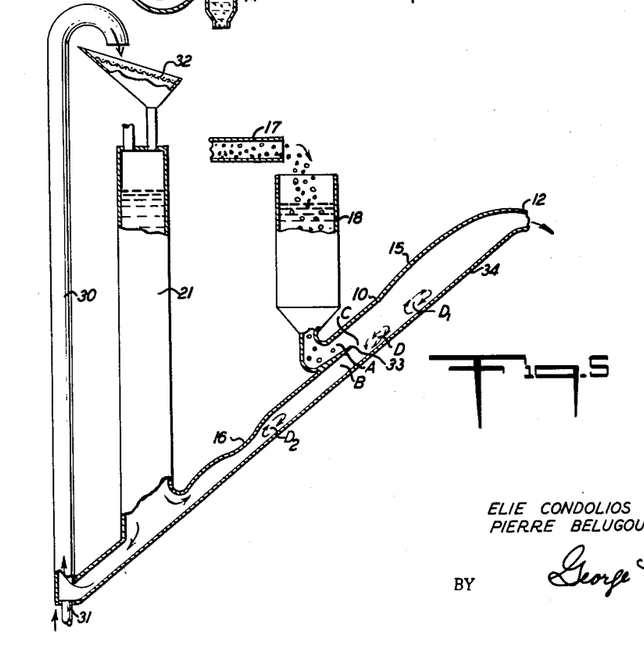
Fig. 5 is a schematic view in longitudinal section of a modification where crude materials to be sorted are introduced into the sorting conduit by a hydraulic feeder.

The water introduced by the feeder 17 into the receiving chamber 18 contributes to the sorting in the conduit 10 along with the water introduced into the sorting conduit from the column 21. The discharge from the latter is so chosen that it appropriately complements that introduced downstream with the crude materials from 18 and gives to the total discharge passing through the conduit 10 a constant optimum value for the sorting action.

As may be seen from Fig. 5, the discharges of water provided by the receiving chamber 18 and by the column 21 are introduced in parallel at 33 into an upper section 34 of the sorting conduit. The sections illustrated at A, B and C are chosen with precision in accordance with the ratio of heavy material to crude materials and the ratio of water from 21 to the total water all with a view to a suitable sorting in each particular case.

The water admitted at 17 with the crude materials may also be dirty and will normally be recycled in all or in part into the feeder 17 after separation from the lighter materials at the discharge 12. On the other hand, it is desirable to use for the complementary water introduced from the column 21 water that is as clean as possible. The heavier fraction recovered at 32 will thus be freed from the lighter even to the extent that the most fine granules thereof are not present. The grille 32 can, therefore, be a very fine screen.

It will be understood that the apparatus of Fig. 5, as well as the other forms of the apparatus shown, can be operated with a view to granulometric sorting.

Figure 6:
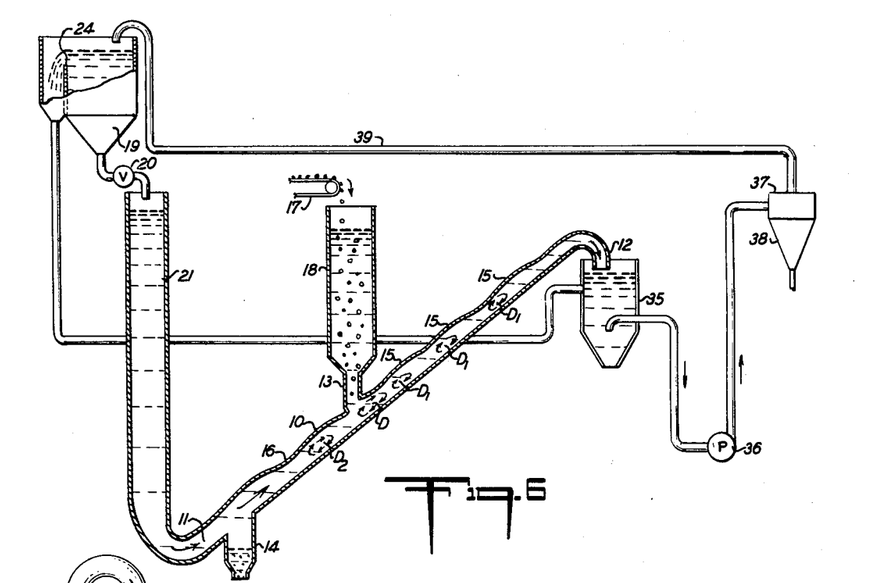
Fig. 6 is a view similar to Fig. 3 showing another system constructed in accordance with the invention to treat a rare mineral having a very small percentage of a heavy product by means of a plurality of stationary dunes which accomplish a practically complete separation of the heavy product by repeated recycling operations.

Reference will now be made to Fig. 6 which is similar to Fig. 3 but which concerns, by way of example, an application of the invention in the treatment of rare minerals. The sorting conduit 10 is arranged to form, in addition to the principal dune D, a number of auxiliary dunes for rewashing $D_1$ and/or $D_2$, thanks to enlargements of the downstream section 15 and/or restrictions of the upstream section 16.

The lighter particles pass from the conduit 10 at 12 and are received into the decantation basin 35 from which they are withdrawn by pump 36 and discharged into a cyclone separator 37 where they are collected at 38. The heavier particles are directly collected at 14. The liquid separated from the lighter particles is returned at 37 by the action of pump 36 through the pipe 39 to the water supply basin 19 of which the overflow 24 is connected to the basin 35.

Figure 1:
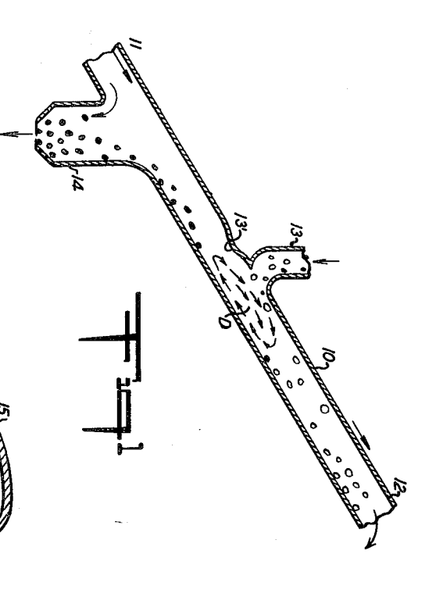
Fig. 1 is a schematic view in longitudinal section of a sorting conduit according to the invention adapted to operation with formation of a single dune.
Figure 7:
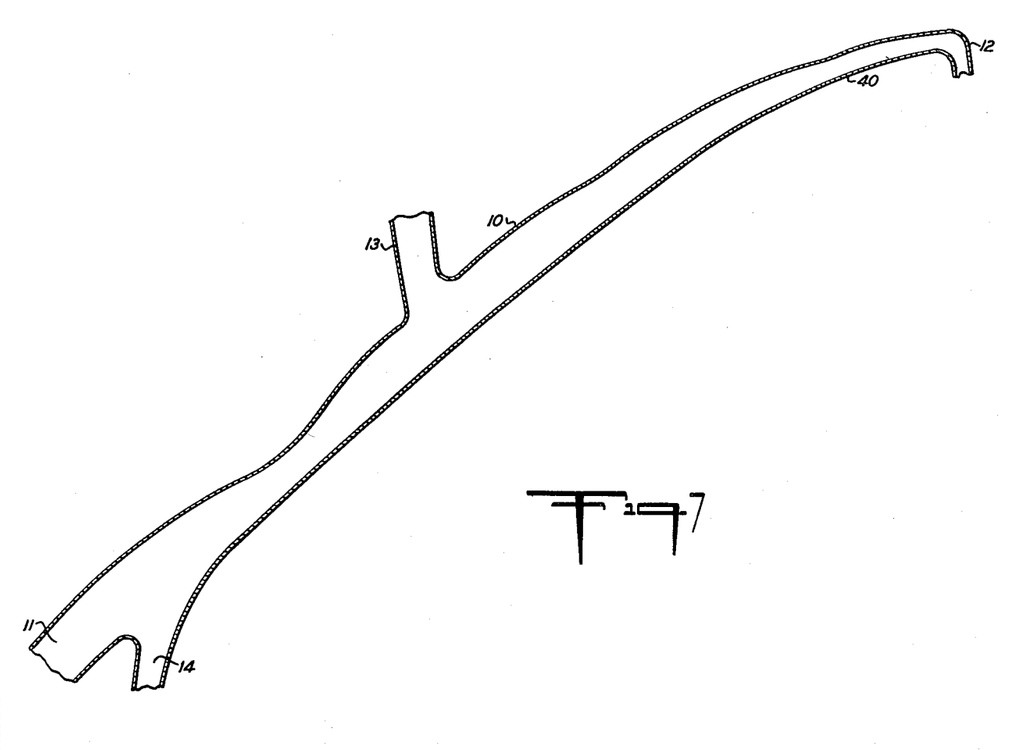
Fig. 7 is a schematic view in longitudinal section of a further modification of the sorting conduit according to the invention.

Reference is now made to Fig. 7 which is similar to Fig. 1 and where one will observe at 10 the sorting conduit, at 11 the inlet for the sorting fluid, at 13 the inlet for the crude material, at 12 the discharge of the liquid and the lighter material and at 14 the discharge of the heavier. But here the inclination and the section of the conduit are both decreased in the downstream part 40. The degree of inclination is intended to induce the deposition of the stray smaller heavier particles and their collection by the dune process. The decrease of the section is intended to counterbalance the lowering of the density of the depositing fraction which results from the decrease of the inclination. The arrangement of Fig. 7 can be applied in all or in part to each of the various previously described embodiments of apparatus according to the invention.

Figure 8:
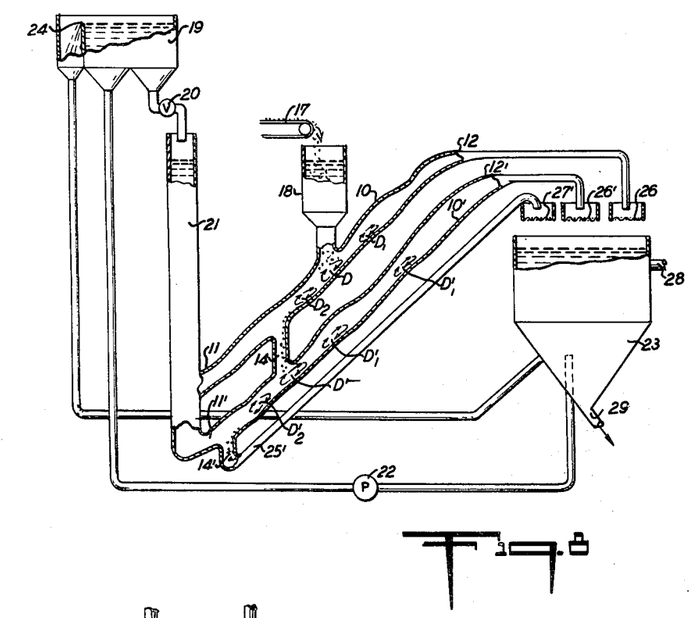
Fig. 8 is a schematic view in longitudinal section showing a system which may be utilized for treating a mineral in two stages.

Reference will now be made to Fig. 8 where the apparatus represented is intended to make possible two cuts of a crude material in such manner as to obtain a light, a mixed and a heavy fraction. A first sorting conduit 10 receives the crude material from the receiving chamber 18 fed at 17. Liquid is supplied at 11 to the conduit 10. The dune action at D, $D_1$ and $D_2$ assures a first cut. The lighter particles are separated and entrained toward the outlet 12 whence they are discharged onto a vibrating dewatering screen 26 while the remainder of the material passes downwardly toward the discharge outlet 14. This latter is connected to a second sorting conduit 10′ fed by liquid introduced at 11′.

In the second conduit 10′ the dune action at D′, $D'_1$ and $D'_2$ assures a second cut between the middlings (intermediates) and heavy. The middlings are entrained toward the outlet 12′ where they are discharged onto a vibrating dewatering screen 26′ while the heavy fraction is received into the passage 14′ whence it can be passed by way of the conduit 25′ to a dewatering vibrating screen 27′.

The introduction of liquid into the conduits 10 and 10′ at 11 and 11′ can be assured through connections to the same column 21 of which the feeding will be analogous to that which has been described in reference to Fig. 3. It will be understood that in the apparatus of Fig. 8, one may provide more than two sorting conduits in cascade relation with a view to realizing more than two cuts from the crude material.

Figure 9:
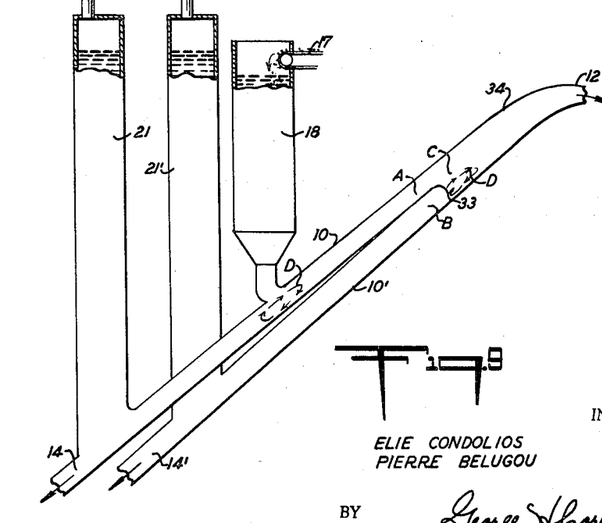
Fig. 9 is a schematic view in longitudinal section of an apparatus similar to one part of the structure shown in Fig. 8 but concerned with a modified form thereof.

According to another modification (Fig. 9), wherein the apparatus is somewhat similar to that of Fig. 8, it is made possible to make at least two cuts of a crude material in such manner as to obtain a light, an intermediate and a heavy fraction. In the arrangement of Fig. 9 which combines the structures of Figs. 4 and 5, the crude material is admitted into the receiving chamber 18 which feeds to the conduit 10. This receives water for the sorting by way of the column 21 and is branched in parallel with the conduit 10′, which two conduits open into section 34 for further sorting and from which the lighter material discharges through the outlet. Conduit 10' is fed with water by a second column 21' which serves to complement the water supplied from the column 21 in order to insure with it the sorting in the section 34.

The intermediate particles or middlings are withdrawn at 14' at the lower end of the conduit 10' while the heavier particles are withdrawn at 14 at the lower end of the conduit 10. Likewise, as in Fig. 5, sections A, B and C of conduits 10, 10' and the section 34 are chosen in appropriate manner to function according to volume of water introduced at 21 and 21' and the proportion of heavy and/or intermediate particles in the crude product.

In place of separating the crude products into light, intermediate and heavy fractions, the apparatus of Fig. 9 may be used for sorting the crude into light fines, coarse light and a heavy fraction. In this case the light fines will be collected at 12, the coarse light particles will be collected at 14', and the heavy at 14. Such a granulo-densimetric sorting presents particular interest in the case of uncleaned coal which will be thereby sorted into slime at 12, into grains as 14' and into schist at 14.

In the various forms of realization of the apparatus that are shown herein, the sorting is, by way of example, effected densimetrically. With the apparatus shown the materials that are to be sorted will, therefore, be chosen according to their susceptibilities of being entrained by saltation which is in fact the case with most materials having a suitable grain size. However, the apparatus of the invention is also applicable to granulometric sorting and for this effect the materials will be advantageously selected according to their susceptibility of being entrained by suspension. This is in fact the case with most materials of sufficient fineness. Furthermore, the fluid which is generally used in the operations herein described is usually a liquid, but it will be understood that for certain applications it may be gaseous.

We claim:

1. The method of separating a mixture of particulate solid materials into a plurality of fractions differing according to their differences of density and/or particle size which comprises introducing said mixture into a fluid passing under head through a closed conduit filled therewith, regulating the velocity of flow of said fluid so as to cause constituents of said mixture to deposit on the bottom of the conduit, which deposit under the force exerted thereon by said fluid current has a tendency to move in the direction of such current, and at the same time maintaining the conduit at an inclination such that the gravitational force brought into action by such inclination combines with the force exerted by said fluid current to cause such deposit to take the form of a substantially stationary dune on the bottom of the conduit.

2. A method according to claim 1, in which the conduit is maintained at an inclination such that the effect of the gravitational force on the dune is substantially equal to the effect of the force exerted on such dune by the fluid current, so that the dune remains substantially stationary at a fixed zone in the conduit and is constantly stirred.

3. A method according to claim 1, wherein the fluid current is a liquid such as water.

4. A method according to claim 3, in which the liquid is fed into the inclined conduit at a point upstream from and below the place of feed of the mixture, and withdrawing the particles of heavy or large material at a point located upstream from said stationary dune.

5. A method according to claim 3, in which the liquid is continuously fed into the conduit at a point upstream from the place of feed of the mixture, and the mixture is fed into the liquid current in a continuous fashion, and withdrawing the particles of heavy or large material in the dune at a point upstream from such place of mixture feed.

6. A method according to claim 3, in which the conduit is maintained at an inclination such that the heavy or large material is caused to escape from the dune and slide along the conduit against the liquid current, collecting such heavy or large material at a place located upstream from the place of feed of the mixture, and entraining at least part of such collected heavy material in a second liquid current.

7. A method according to claim 3, wherein the liquid current is caused to have a velocity of flow at a localized zone of such conduit different from the velocity of the liquid current through the zone in which the stationary dune is located and such as to cause a second dune to form in such localized zone.

8. Apparatus for sorting particulate solid materials into a plurality of fractions differing according to their differences of density and/or particular size, comprising an inclined closed conduit having a substantially smooth supporting surface, means for supplying fluid under head to the lower portion of said conduit, so that such fluid flows through said conduit as a continuous stream which is capable of sustaining in suspension at least one of the fractions of the particulate material, means for controlling the velocity of said fluid flow at a predetermined place in said conduit and means spaced upwardly from said supplying means and spaced downwardly a substantial distance from the upper end of said conduit for feeding said materials to the fluid passing through said conduit, the inclination of said conduit and the velocity given the fluid flow by said control means at the predetermined place in said conduit being such that their combined action on such materials brings about the formation on said supporting surface at such place of a substantially stationary dune which is constantly stirred.

9. Apparatus for sorting particulate solid materials into a plurality of fractions differing according to their differences of density and/or particular size, comprising an inclined closed conduit having a substantially smooth supporting surface, means for supplying liquid under head to the lower portion of said conduit, and including a liquid supply tank the lower part of which is connected to said conduit, a feeding basin having a substantially constant level, a first liquid passage extending from said basin to said tank, and means for producing a constant liquid flow in said passage, and means spaced upwardly from said liquid supplying means and spaced downwardly a substantial distance from the upper end of said conduit for feeding said materials to the fluid passing through said conduit, the inclination of said conduit and the velocity of the fluid flow at a predetermined place in said conduit being such that their combined action on such materials brings about the formation on said supporting surface at such place of a substantially stationary dune which is constantly stirred.

10. Apparatus according to claim 9, further comprising a collection basin arranged to receive the liquid discharged from the feeding constant level basin, an overflow weir for said feeding constant level basin, a second liquid passage from said overflow weir to said collection basin, a third liquid passage between the liquid outlet of said sorting conduit and said collection basin, and pump means for returning liquid from said collection basin to said feeding basin.

11. Apparatus according to claim 10, wherein said third liquid passage includes a vibrating screen adapted to retain and dewater the fraction which is discharged together with the liquid at the upper outlet of said conduit.

12. Apparatus according to claim 8, further comprising a lower outlet for discharging a fraction of products together with liquid, said lower outlet being in communication with and receiving liquid from said fluid supplying means, and lift means for said fraction and liquid connected with said lower outlet.

13. Apparatus according to claim 12, wherein said lift means consists of air-lift means located upstream from said fluid supplying means.

14. Apparatus for sorting particulate solid materials into a plurality of fractions differing according to their differences of density and/or particular size, comprising an inclined closed conduit having a substantially smooth supporting surface, means for supplying fluid under head to the lower portion of said conduit, and means spaced upwardly from said supplying means and spaced downwardly a substantial distance from the upper end of said conduit for feeding said materials to the fluid passing through said conduit, the section of said conduit extending upwardly from the point of introduction thereto of the crude materials having a cross-sectional area greater than the section of said conduit extending downwardly therefrom, the inclination of said conduit and the velocity of the fluid flow at a predetermined place in said conduit being such that their combined action on such materials brings about the formation on said supporting surface at such place of a substantially stationary dune which is constantly stirred.

15. Apparatus according to claim 14, wherein the feeding means comprises means for providing at said place of introduction a head of fluid capable of cooperating with said fluid supplying means to bring about the fluid flow for the sorting in said conduit section of enlarged cross-sectional area, and means for discharging the crude material into such head of fluid.

16. The process of separating constituents of a mixture of solid particulate materials in which one constituent thereof has a greater density and/or particle size than another constituent of said mixture, which comprises continuously introducing said mixture into a fluid flowing in a closed, inclined conduit at a predetermined controlled velocity at the place of entry of said mixture, controlling the velocity of flow of said fluid at a portion of the longitudinal path of flow thereof so that the flow of fluid through such path portion shall be at a velocity which is below that required to sustain said one constituent in suspension in the fluid and such as to cause the major part of said one constituent of the mixture entering such path portion to deposit on the bottom of the conduit in such path portion, and which velocity is above that required to entrain said other constituent and such as to enable said fluid to carry the major part of said other constituent of the mixture entering such path portion out of such path portion, and maintaining the velocity of the fluid in such path portion sufficiently high while at the same time maintaining such path portion at an inclination such that the gravitational force brought into action by such inclination combined with the force exerted by the fluid current cause the depositing particles to form on the inclined bottom of such path portion a substantially fixed dune that is constantly agitated and stirred within itself to release to the fluid flow particles of said other constituent which may have become entrapped in the dune by the depositing particles of said one constituent, the inclination of said path portion being such that during the continuous feed of said mixture to said fixed dune particles of said one constituent move upstream away from said dune and down and out of said path portion.

17. Apparatus for separating constituents of a mixture of solid particulate materials in which one constituent thereof has a greater density and/or particle size than another constituent of said mixture, which comprises a closed conduit having a substantially smooth supporting surface disposed at a predetermined inclination to bring into action a required degree of gravitational force on said one constituent, means for continuously supplying a fluid to the lower upstream end of said conduit so that such fluid fills said conduit and flows through the same as a continuous stream capable of sustaining in suspension at least such other constituent of the mixture, means for continuously feeding said mixture of such solid materials into the fluid flowing through said conduit, means for controlling the velocity of flow of the fluid at a longitudinal portion of said conduit so that the flow of fluid through such conduit portion shall be at a velocity which is below that required to sustain said one constituent in suspension in the fluid and such as to cause the major part of said one constituent of the mixture entering such conduit portion to deposit on the supporting surface portion at the bottom of such conduit portion, and which velocity is above that required to entrain said other constituent and such as to enable the fluid to carry the major part of said other constituent of the mixture entering such conduit portion out of such conduit portion, said controlling means being operable to maintain the velocity of the fluid in such conduit portion high enough that the force exerted by the fluid current combined with the gravitational force brought into action by the inclination of said supporting surface cause the depositing particles to form on the inclined supporting surface portion of said conduit portion a substantially fixed dune that is constantly agitated and stirred within itself to release to the fluid flow particles of said other constituent which may have become entrapped in the dune by the depositing particles of said one constituent, the inclination of said supporting surface being such that during the continuous feed of said mixture to said fixed dune particles of said one constituent move upstream away from said dune and down and out of said conduit portion, and means for enabling the deposited particles of said one constituent moving down said supporting surface to be withdrawn from said conduit.

18. The process of separating constituents of a mixture of solid particulate materials in which one constituent thereof has a greater density and/or particle size than another constituent of said mixture, which comprises continuously introducing said mixture into a fluid flowing in a closed conduit at a predetermined controlled velocity at the place of entry of said mixture, controlling the velocity of flow of said fluid at a portion of the longitudinal path of flow thereof so that the flow of fluid through such path portion shall be at a velocity which is below that required to sustain said one constituent in suspension in the fluid and such as to cause the major part of said one constituent of the mixture entering such path portion to deposit on a supporting surface in such path portion, and which velocity is above that required to entrain said other constituent and such as to enable said fluid to carry the major part of said other constituent of the mixture entering such path portion out of such path portion, and maintaining the velocity of the fluid in such path portion sufficiently high while simultaneously applying such frictional force in a direction counter to the fluid flow to the particles which have deposited on and are in engagement with said supporting surface that the combined action of such force and fluid velocity cause the depositing particles to form on said surface a substantially fixed dune that is constantly agitated and stirred within itself to release to the fluid flow particles of said other constituent which may have become entrapped in the dune by the depositing particles of said one constituent, the said frictional force applied to the particles in engagement with said surface being such that during the continuous feed of said mixture to said fixed dune particles of said one constituent in engagement with said surface are moved upstream away from said dune and out of such path portion.

19. Apparatus for sorting particulate solid materials into a plurality of fractions differing according to their differences of density and/or particular size, comprising an inclined closed conduit having a substantially smooth supporting surface, means for supplying fluid under head to the lower portion of said conduit, and means spaced upwardly from said supplying means and spaced downwardly a substantial distance from the upper end of said conduit for feeding said materials to the fluid passing through said conduit, the inclination of said conduit and the velocity of the fluid flow at a predetermined place in said conduit being such that their combined action on such materials brings about the formation on said supporting surface at such place of a substantially stationary dune which is constantly stirred, the cross-sectional area of said conduit being reduced at a section adjacent to said predetermined place and located downwardly from said material feeding means to provide a slight restriction at such section.

20. Apparatus for sorting particulate solid materials into a plurality of fractions differing according to their differences of density and/or particular size, comprising an inclined closed conduit having a substantially smooth supporting surface, means for supplying fluid under head to the lower portion of said conduit, and means spaced upwardly from said supplying means and spaced downwardly a substantial distance from the upper end of said conduit for feeding said materials to the fluid passing through said conduit, the inclination of said conduit and the velocity of the fluid flow at a predetermined place in said conduit being such that their combined action on such materials brings about the formation on said supporting surface at such place of a substantially stationary dune which is constantly stirred, said conduit having a local variation in its cross-sectional area at a place spaced from said predetermined place and enabling it to form a rewashing auxiliary dune at such spaced place.

21. Apparatus for sorting particulate solid materials into a plurality of fractions differing according to their differences of density and/or particular size, comprising an inclined closed conduit having a substantially smooth supporting surface, means for supplying fluid under head to the lower portion of said conduit, and means spaced upwardly from said supplying means and spaced downwardly a substantial distance from the upper end of said conduit for feeding said materials to the fluid passing through said conduit, the inclination of said conduit and the velocity of the fluid flow at a predetermined place in said conduit being such that their combined action on such materials brings about the formation on said supporting surface at such place of a substantially stationary dune which is constantly stirred, a lower outlet for discharging a fraction of products together with liquid and being in communication with and receiving liquid from said fluid supplying means, lift means for said fraction and liquid connected with said lower outlet, said lower outlet comprising a liquid passage between said lift means and the liquid supplying means in the conduit and said lift means discharging into said liquid supply means, and screen means between the discharge end of said lift means and said liquid supply means for retaining solid products, whereby the liquid discharged at said lower outlet is exactly reintroduced in said conduit.

22. Apparatus for sorting particulate solid materials into a plurality of fractions differing according to their differences of density and/or particular size, comprising an inclined closed conduit having a substantially smooth supporting surface, means for supplying fluid under head to the lower portion of said conduit, and means spaced upwardly from said supplying means and spaced downwardly a substantial distance from the upper end of said conduit for feeding said materials to the fluid passing through said conduit, the inclination of said conduit and the velocity of the fluid flow at a predetermined place in said conduit being such that their combined action on such materials brings about the formation on said supporting surface at such place of a substantially stationary dune which is constantly stirred, and the degree of inclination of the portion of said conduit upwardly from said feeding means and the cross-sectional area of such inclined portion of the conduit both decreasing from the feeding means in the direction of the flow of the fluid therethrough.

23. Apparatus for sorting particulate solid materials into at least three fractions differing according to their differences of density and/or particular size, comprising an inclined closed conduit having a substantially smooth supporting surface, means for supplying fluid under head to the lower portion of said conduit, and means spaced upwardly from said supplying means and spaced downwardly a substantial distance from the upper end of said conduit for feeding said materials to the fluid passing through said conduit, the inclination of said conduit and the velocity of the fluid flow at a predetermined place in said conduit being such that their combined action on such materials brings about the formation on said supporting surface at such place of a substantially stationary dune which is constantly stirred, a second inclined sorting conduit connected at its lower portion to said fluid supply means so that both sorting conduits are simultaneously fed by fluid, and means for discharging a separated fraction from said first mentioned conduit to said second conduit, wherein said separated fraction forms in said second conduit a crude product to be sorted, the inclination of said second conduit being such that the crude product forms in such conduit a substantially stationary, constantly stirred dune.

References Cited in the file of this patent

UNITED STATES PATENTS

| | | |
|---|---|---|
| 866,415 | Anderson | Sept. 17, 1907 |
| 1,332,751 | Polo | Mar. 2, 1920 |
| 1,458,234 | Miller | June 12, 1923 |
| 2,022,585 | Chance | Nov. 26, 1935 |

FOREIGN PATENTS

| | | |
|---|---|---|
| 9,737 | Great Britain | Mar. 13, 1913 |